Patented Oct. 20, 1936

2,057,671

UNITED STATES PATENT OFFICE 2,057,671

PROCESS OF COATING

Camille Dreyfus, New York, N. Y.

No Drawing. Application July 31, 1931, Serial No. 554,389. Renewed April 22, 1936

3 Claims. (Cl. 91—70)

This invention relates to compositions containing vinyl compounds, and relates more particularly to compositions containing at least partially polymerized vinyl compounds which are plasticized with aryl phosphates.

This application is a continuation-in-part of my co-pending application Serial No. 264,282 filed March 23, 1928, now Patent No. 1,950,662 of Mar. 13, 1934.

An object of my invention is to produce compositions containing at least partially polymerized vinyl compounds which contain aryl phosphates as plasticizers, which compounds have the desirable degree of flexibility and which also have other desirable properties. Other objects of this invention will appear from the following detailed description.

Resins formed by the polymerization of vinyl compounds are well known. However the completely polymerized vinyl products are so brittle, that for many purposes it is desirable to impart the desired degree of flexibility to the products containing the same. However most of the so-called camphor substitutes, that is plasticizers used for compositions containing derivatives of cellulose, are not suitable for use in connection with the polymerized vinyl compounds. Particularly if products containing such polymerized vinyl compounds are to be employed as electrical insulators, I have found that most of the so-called camphor substitutes reduce the dielectric strength of compositions containing polymerized vinyl compounds when added thereto. However I have discovered that the aryl phosphates are excellent plasticizers for polymerized vinyl compounds and impart not only flexibility and other desirable properties to compositions containing the same, but also increase or at least do not diminish their dielectric strength.

In accordance with my invention, I prepare compositions containing a polymerized vinyl compound resin and an aryl phosphate as plasticizer.

As stated before, my composition should contain a resin of the polymerized vinyl compound type. Any suitable vinyl compound that is, a compound having the group $CH_2=CH$ therein, may be used for making the polymerized product to be employed in my invention. Of the vinyl compounds that may be used, I prefer the vinyl acetate, but it is to be understood that other vinyl compounds, such as the compound formed by dehalogenating a vinyl halide by means of zinc dust, vinyl propionate, vinyl phosphate, vinyl chloride etc. may be used. The vinyl compound may be polymerized by sunlight, by ultraviolet light, such as is emitted from a mercury vapor lamp, or in any suitable manner. Catalytic assistants such as uranium salts, carbon tetrachloride, etc. may be employed, although their use is not required for polymerizing many vinyl compounds, e. g. vinyl acetate. Heat may be employed to accelerate the polymerization of the vinyl compounds while they are exposed to light; or after initiation of the polymerization, the source of light may be removed and polymerization caused to proceed solely by the use of heat. The degree to which the vinyl compound is polymerized may be varied to suit the requirements of the operator. Thus the vinyl compound may be only partially polymerized to a jelly like consistency prior to addition to the coating composition, and further polymerization of the vinyl compound effected in the composition or after application to surfaces such as wire, fabric and the like. On the other hand, the vinyl compound may be polymerized to a solid or resin state, care, however, being taken that the polymerization be not carried to the point where a hard product that is insoluble in organic solvents is formed. While the vinyl compounds are preferably at least partially polymerized prior to their addition to the solvents and plasticizers, the unpolymerized vinyl compound may be added to such solvents and plasticizers, and the composition containing the same exposed to such conditions as to polymerize the vinyl compounds. This polymerization of the vinyl compounds may be wholly effected while in solution in the composition or only partially so, the remaining required polymerization taking place after application to any desired surface.

The polymerized vinyl compounds above described, and particularly those formed from vinyl acetate, are compatible with cellulose derivatives and particularly cellulose acetate, and form homogeneous and clear solutions with them, which do not precipitate out either in the solution or in the films formed therefrom.

The composition containing the vinyl resin, may or may not contain organic derivatives of cellulose. Examples of organic derivatives of cellulose are organic esters such as cellulose acetate, cellulose formate, cellulose propionate and cellulose butyrate; and cellulose ethers such as ethyl cellulose, methyl cellulose and benzyl cellulose.

The composition as stated, contains as plasticizer a suitable aryl phosphate such as tricresyl phosphate, triphenyl phosphate. If desired a small proportion of other plasticizers may be added, examples of such plasticizers being various amides such as mono methyl toluene sulphonamid, triacetin, diphenylol propane, thio carbanilid etc. The composition also may or may not contain natural gums or resins or semisynthetic resins such as manila, accaroides, pontianak, kauri, dammar, resin, shellac or ester gum (glycerol ester of rosin). For preparing the composition, medium and/or high boiling solvents such as ethyl acetate, ethyl lactate, tetrachlorethane, benzyl alcohol or diacetone alcohol as well as volatile solvents such as acetone alcohol (ethyl or methyl), benzene, toluene or ethylene dichloride may be employed.

The compositions made in accordance with my invention may be coating compositions to be applied to foraminous material, as is set forth in my parent application No. 264,282, or may be used for any other purpose such as coating of metallic wires, fabrics, paper, etc. particularly when the films formed from such coating composition are to be relied on as non-conductors or insulators for electricity. Plastic compositions and plastic masses may also be made in accordance with this invention.

In order further to illustrate my invention, but without being limited thereto, the following examples are given.

Example

| | Parts by weight |
|---|---|
| Polymerized vinyl acetate | 8 |
| Aryl phosphate | 2 |
| Low boiling solvent | 100 |
| Ethyl lactate | 5 |

The aryl phosphate may be triphenyl phosphate, tricresyl phosphate or a mixture of the two.

It is to be understood that the foregoing example is given merely by way of illustration and that many variations may be made therein, without departing from the spirit of my invention.

Having described my invention, what I desire to secure by Letters Patent is:

1. Method of coating surfaces which comprises applying to said surfaces a composition containing a vinyl compound partially polymerized to a jelly-like consistency and an aryl phosphate as plasticizer in amounts sufficient to produce a flexible coating of high di-electric strength and then further polymerizing the said vinyl compound until a substantially hard coating is formed on the surfaces.

2. Method of coating surfaces which comprises applying to said surfaces a composition containing a vinyl acetate partially polymerized to a jelly-like consistency and an aryl phosphate as plasticizer in amounts sufficient to produce a flexible coating of high di-electric strength and then further polymerizing the said vinyl acetate until a substantially hard coating is formed on the surfaces.

3. Method of coating surfaces which comprises applying to said surfaces a composition containing a vinyl compound partially polymerized to a jelly-like consistency, an organic derivative of cellulose and an aryl phosphate as plasticizer in amounts sufficient to produce a flexible coating of high di-electric strength and then further polymerizing said vinyl compound until a substantially hard coating is formed on the surfaces.

CAMILLE DREYFUS.